US012705960B2

(12) United States Patent
Pickard et al.

(10) Patent No.: US 12,705,960 B2
(45) Date of Patent: Aug. 11, 2026

(54) SYSTEM AND A METHOD FOR CHANGING COLOR OF POOL LIGHTS

(71) Applicant: Pentair Water Pool & Spa, Inc., Cary, NC (US)

(72) Inventors: Zachary Steven Pickard, Carrboro, NC (US); Jacob Moya-Mendez, Denton, NC (US)

(73) Assignee: Pentair Water Pool & Spa, Inc., Cary, NC (US)

( * ) Notice: Subject to any disclaimer, the term of this patent is extended or adjusted under 35 U.S.C. 154(b) by 789 days.

(21) Appl. No.: 17/817,118

(22) Filed: Aug. 3, 2022

(65) Prior Publication Data

US 2023/0042259 A1 Feb. 9, 2023

Related U.S. Application Data

(60) Provisional application No. 63/203,917, filed on Aug. 4, 2021.

(51) Int. Cl.

| | |
|---|---|
| ***G08B 5/36*** | (2006.01) |
| ***E04H 4/14*** | (2006.01) |
| ***G01D 21/02*** | (2006.01) |
| ***H05B 47/105*** | (2020.01) |

(52) U.S. Cl.

CPC ............... *G08B 5/36* (2013.01); *E04H 4/148* (2013.01); *G01D 21/02* (2013.01); *H05B 47/105* (2020.01)

(58) Field of Classification Search

None

See application file for complete search history.

(56) References Cited

U.S. PATENT DOCUMENTS

| | | | | |
|---|---|---|---|---|
| 2005/0044617 | A1* | 3/2005 | Mueller | E04H 4/148 4/496 |
| 2017/0209338 | A1* | 7/2017 | Potucek | F04D 15/0218 |
| 2020/0148552 | A1* | 5/2020 | Yizhack | C02F 1/008 |
| 2021/0147255 | A1* | 5/2021 | Burnham | E04H 4/1209 |

FOREIGN PATENT DOCUMENTS

| | | | |
|---|---|---|---|
| WO | 2017127802 | A1 | 7/2017 |
| WO | 2018193263 | A1 | 10/2018 |

OTHER PUBLICATIONS

Extended European Search Report issued for European Patent Application 22 188 719.3 dated Dec. 12, 2022, 7 pages.

* cited by examiner

*Primary Examiner* — Raymond L Nimox

(74) *Attorney, Agent, or Firm* — Husch Blackwell LLP

(57) ABSTRACT

A system and a method is provided for automatically changing color of pool lights to provide a visual notification regarding any change or anomaly associated with pool water. The system may comprise a receiver adapted to receive a measured value corresponding to one or more water quality parameters associated with water of a pool. The system may comprise a controller to analyze the measured value corresponding to the one or more water quality parameter to determine whether there is an anomaly associated with one or more of the water quality parameters; and a transmitter adapted to transmit a signal to one or more lights of the pool for changing from a first state to a second state based on the anomaly.

20 Claims, 3 Drawing Sheets

SYSTEM AND A METHOD FOR CHANGING COLOR OF POOL LIGHTS

CROSS-REFERENCE TO RELATED APPLICATIONS

This application claims priority to U.S. Provisional Application No. 63/203,917 filed Aug. 4, 2021, which is incorporated by reference in its entirety for all purposes.

BRIEF SUMMARY OF THE INVENTION

The present disclosure generally relates to lighting for an aquatic application such as a pool. More particularly, a system and a method for automatically changing color of pool lights to visually notify a user of a change in one or more water quality parameters.

BACKGROUND OF THE INVENTION

Conventional pools and pool equipment systems may be equipped with one or more sensors for measuring one or more parameters related to water quality. The one or more water quality parameters may be based on parameters such as pH, temperature, oxidation-reduction potential (ORP), hardness, alkalinity, cyanuric acid, free chlorine, chloramine, turbidity, and bacteria/virus levels. A user may want the one or more water quality parameters to be maintained at a predetermined value or range of values for comfort and safety. Thus, the user may adjust one or more dosage rates of one or more water chemistries based on the one or more sensors' reading.

However, a user may not be able to determine the current water quality by merely looking at the pool water. Therefore, a user may need to consult a local display panel or a remote display that informs the user of the water quality. For example, if the pool water temperature is lower than a desired water temperature, the operator and/or pool users may have no way of knowing this, other than to manually read a thermometer or to observe a temperature display that is connected to the pool's equipment system.

Therefore, there is a need in the market for a system and a method to visually inform the user of a change in one or more water quality parameters by merely looking at the pool.

SUMMARY

A system for automatically changing the color of one or more pool lights based on one or more water quality parameters is provided. In some embodiments, the one or more water quality parameters may be selected from a group consisting of a temperature value, a chlorine level, a filter pressure value, a skimmer basket blockage alert, a salt level value, a pH value, an oxidation-reduction potential (ORP) value, a hardness value, an alkalinity value, a cyanuric acid value, a free chlorine value, a chloramine value, a turbidity value, a bacteria/virus level, and combinations thereof.

In some embodiments, the one or more water quality parameters may be monitored by one or more sensors. The one or more sensors may be installed in the pool and/or near the pool (e.g., pool pad, pool plumbing, or the like). The one or more sensors may be programmed to continuously monitor the one or more water quality parameters over a predefine period of time. The one or more sensors may be programmed to monitor the one or more water quality parameters in response to a prompt from a user.

In some embodiments, the one or more sensors may be connected to a server. The server may comprise a receiver, a processing unit, a memory, and a transmitter. The receiver may be configured to receive information from the one or more sensors. The processing unit may be configured to determine that a measured value of the one or more water quality parameters has changed and/or exceeded a threshold, and/or has moved outside of a tolerance window. The processing unit may compare a measured value received from the one or more sensors to a stored value. The stored value may be stored in the memory of the server. The stored value may be a pre-defined threshold or target value, or target range. The stored value may be a historical measured value, a value set by a user, and/or a value set by a manufacturer. The processing unit may determine there is an anomaly associated with one or more of the water quality parameters (e.g., the measured value is larger than, smaller than, or equal to the stored value or range. The processing unit may send a signal to the transmitter indicating a change in one or more water quality parameters has occurred. The transmitter may be configured to send a signal to one or more lights to change from a first state to a second state based on the anomaly.

The one or more lights may be installed in the pool or spa and/or installed near the pool or spa. In some embodiments, the first state is defined as when the light is provided in an off configuration. In another embodiment, the first state is when the light is provided as a first color in an on configuration. When the one or more lights change from a first state to a second state, a user may be provided with a visual notification that there is an anomaly associated with one or more water quality parameters. The user may set or customize a color of the one or more lights to provide the visual notification regarding the anomaly associated with water quality.

In some embodiments, the transmitter is adapted to transmit a signal to one or more devices associated with the pool (e.g., chlorinator, pH measuring/dispensing system, chemical dispensing system, heater, filter, etc.) instructing the device (e.g., pool equipment system) to adjust a dosage rate of one or more water chemistries for controlling the one or more water quality parameters.

A method for automatically changing the color of one or more pool lights based on a parameter status of pool or spa water is provided. The method comprises a sensor measuring one or more parameters associated with water of a pool to define a measured value, transmitting the measured value corresponding to one or more parameters associated with water of a pool to a pool controller, the controller analyzing and comparing the measured value corresponding to the one or more parameters to a target valve, and determining if the measured value is different from the target value. The controller transmitting a signal to one or more lights of the pool for changing from a first color to a second color if the measured value is different from the target value.

DETAILED DESCRIPTION

Figure 1:
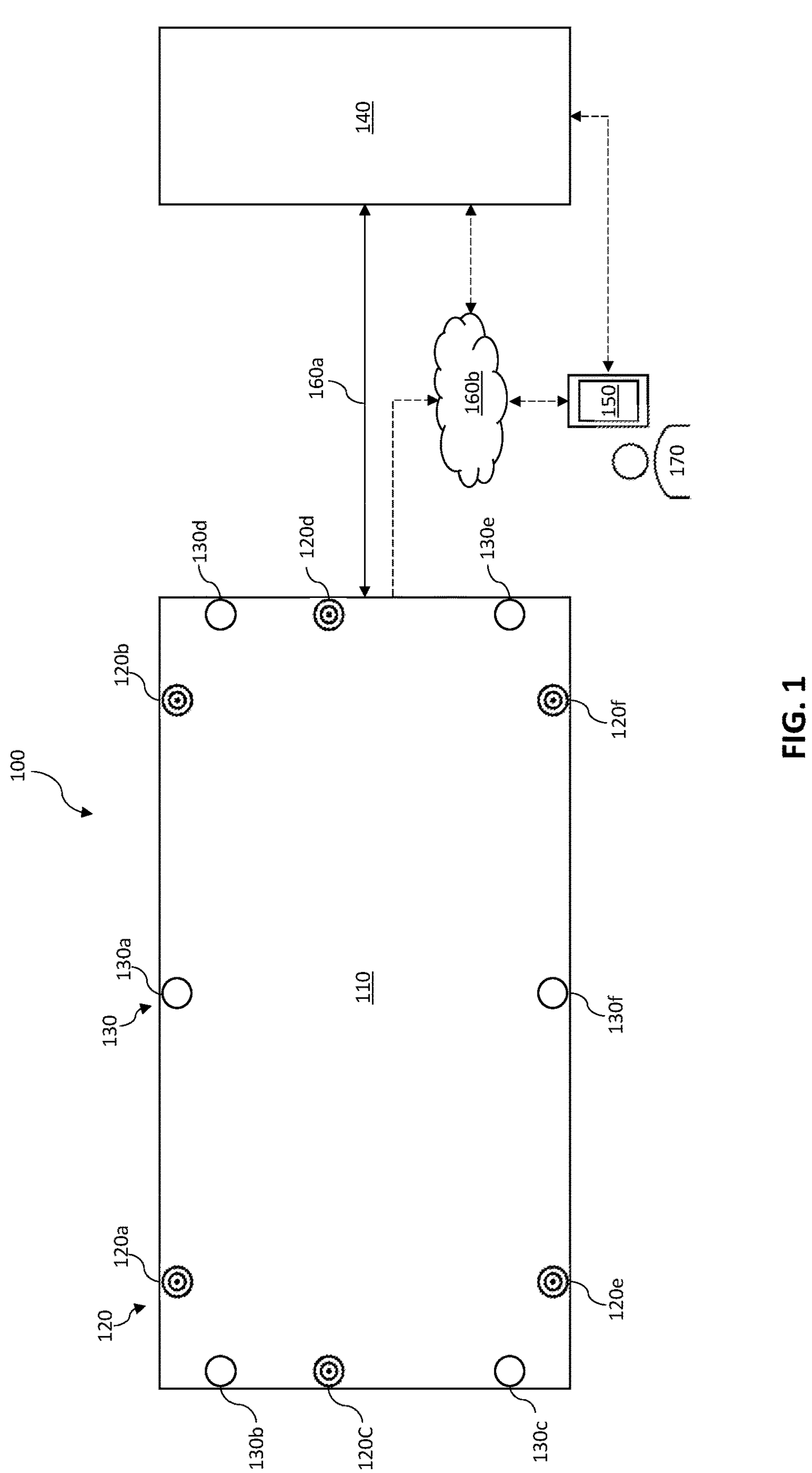
FIG. 1 schematically illustrates a pool or spa system architecture according to an embodiment.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

As used herein, unless otherwise specified or limited, the terms "mounted," "connected," "supported," and "coupled" and variations thereof are used broadly and encompass both direct and indirect mountings, connections, supports, and couplings. Further, unless otherwise specified or limited, "connected" and "coupled" are not restricted to physical or mechanical connections or couplings, but can also refer to communicative, electrical, or fluidic couplings.

Referring to FIG. 1, an aquatic system architecture 100 is shown. Specifically, a pool 110 with water is depicted. Although FIG. 1 illustrates a pool 110, the system architecture 100 may comprise various aquatic bodies such as a hot tub, a spa, a pond, a basin, a tank, or similar bodies of water.

The pool 110 and the water associated therewith is in communication with one or more sensors 120. As shown, the pool 110 may have six sensors 120*a*-120*f*. The plurality of sensors 120 may be installed in the pool 110 and/or are installed near the pool 110. For example, as illustrated, the plurality of sensors 120 may be positioned inside the pool 110 around the perimeter of a swimming area (i.e. the boundary of the pool area 110). However, one or more of the plurality of sensors 120 may be positioned outside of the swimming area. For example, one or more of the sensors 120 may be positioned in a plumbing system of the pool 110 where a sensing surface of the plurality of sensors 120 are allowed to contact the water of the pool 110, and/or on the pool pad. A non-wetted end of the plurality of sensors 120 may protrude from the water (i.e. the plurality of sensors 120 may not be completely submerged in the water). Although six sensors are depicted, only a single sensor may be provided, or two sensors, three sensors, four sensors, five sensors, or more than six sensors. In some instances, the sensors are the same and/or may be designed to measure the same water quality parameter. In other instances, the sensors are different and/or may be designed to measure different water quality parameters with respect to each other.

In some embodiments, the one or more sensors of the plurality of sensors 120 may be integrated into a larger hardware component of an overall pool automation system of the pool 110. For instance, a pool heater may be provided with an integrated sensor capable of sensing the water temperature of the pool 110.

In some embodiments, the plurality of sensors 120 may include one or more of a temperature sensor, a chlorine level sensor, a filter pressure sensor, a skimmer basket blockage sensor, a salt level sensor, a water cleaner sensor, a water chemical sensor, and any other sensor types used to sense water quality or supporting equipment thereof. It is to be understood that although only a limited list of sensors is described herein, any other types of sensors as known by persons skilled in the art can be deployed in the pool 110.

The pool 110 may further comprise a plurality of lights 130. The plurality of lights 130 may be light emitting diodes (LEDs). The plurality of lights 130 may be configured to display one or more colors depending on the embodiment. It is to be understood that although FIG. 1 shows the system architecture 100 as having six lights 130*a*-130*f*, this is not to be considered limiting. The system architecture 100 may comprise more or fewer lights depending on the embodiment. It is to be further understood that the number of lights 130 may or may not be equivalent to the number of sensors 120.

Similar to the plurality of sensors 120, one or more of the plurality of lights 130 may be installed in the pool 110 and/or installed near the pool 110. For example, in some embodiments, the plurality of lights 130 are installed in the pool 110 such that the plurality of lights 130 are submerged under the water in the pool 110 and are contained within a niche and housing provided in the form of a pool light. Additionally, or alternatively, in some embodiments one or more of the plurality of lights 130 may be installed at an outer periphery of the pool 110 above the water level in the pool 110.

The plurality of sensors 120 and the plurality of lights 130 may be connected to a server 140 over a network 160. In one embodiment, the network 160 may be a wired cable connection 160*a*. In another embodiment, the network 160 may be a wireless network 160*b*. The server 140 may be a remote processing unit and/or a pool automation system/equipment having a controller capable of performing the operations/functions as described herein. In other embodiments, the server 140 and the pool automation system are separate entities which are connected through a network such as the network 160.

Figure 2:
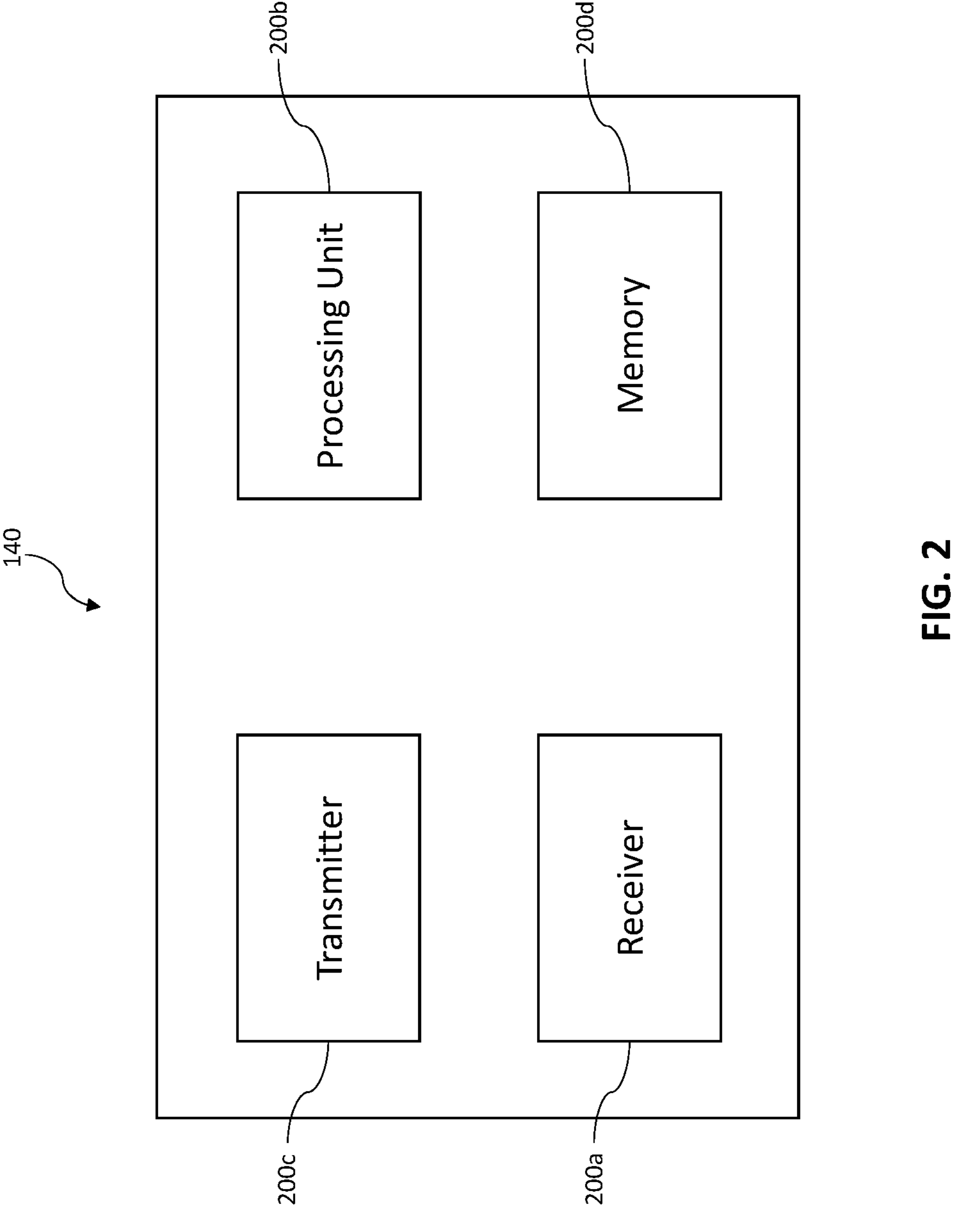
FIG. 2 schematically illustrates a controller for automatically changing a color of at least one pool light according to an embodiment.

Referring to FIG. 2, the server 140 is shown in more detail. The server 140 may comprise a receiver 200*a*, a processing unit 200*b*, a transmitter 200*c*, and a memory 200*d*. The server 140 may be a single-core processor, a dual-core processor, a quad-core processor, a hexa-core processor, an octa-core processor, a deca-core processor and/or any such processor that is obvious to a person skilled in the art.

The receiver 200*a* may be configured to receive measured values and/or indications corresponding to one or more parameters associated with the water quality of the pool 110 from the plurality of sensors 120. The receiver 200*a* may communicate the information received from the plurality of sensors 120 to the processing unit 200*b*.

The processing unit 200*b* may be adapted to analyze the information received from the plurality of sensors 120 to determine if there is an anomaly associated with one or more water quality parameters of the pool water. For example, the processing unit 200*b* may retrieve a pre-defined threshold value or range stored in the memory 200*d*. In some instances, the processing unit 200*b* may be adapted to analyze the information received from the plurality of sensors 120 to determine if the measured value is more than, equal to, or less than the pre-defined threshold value or range.

The memory 200*d* may store historical values and information and pre-set values and ranges. The memory 200*d* may be a read access memory (RAM), a read only memory (ROM), a flash memory and/or any such memory that is obvious to a person skilled in the art.

Referring back to FIG. 1, the plurality of sensors 120, the plurality of lights 130, and the server 140, may be connected to a user device 150 over the network 160. The user device 150 can be used to set or define a stored value or range stored in the memory 200*d*. For example, a user 170 can use an application stored in the user device 150 to define a lower and upper threshold values for water temperature. In some forms, the user 170 may define one or more threshold values corresponding to a pH, ORP, hardness, alkalinity, cyanuric acid, free chlorine, chloramine, turbidity, or other qualities of the aquatic body being monitored.

After the processing unit 200*b* retrieves one or more of the stored values, ranges, and information from the memory 200*d*, the processing unit 200*b* may compare the measured value received from the plurality of sensors 120 to the stored value retrieved from the memory 200*d.*

If the received value from the plurality of sensors 120*a* is different than, equal to, more than, or less than the stored value or range retrieved from the memory 200*d*, the processing unit 200*b* may determine that there is an anomaly associated with one or more water quality parameters. If an anomaly is detected, the processing unit 200*b* may communicate with the transmitter 200*c* to send a signal to one or more of the plurality of lights 130, instructing the one or more of the plurality of lights 130 to change from a first state to a second state based on the anomaly.

Figure 3:
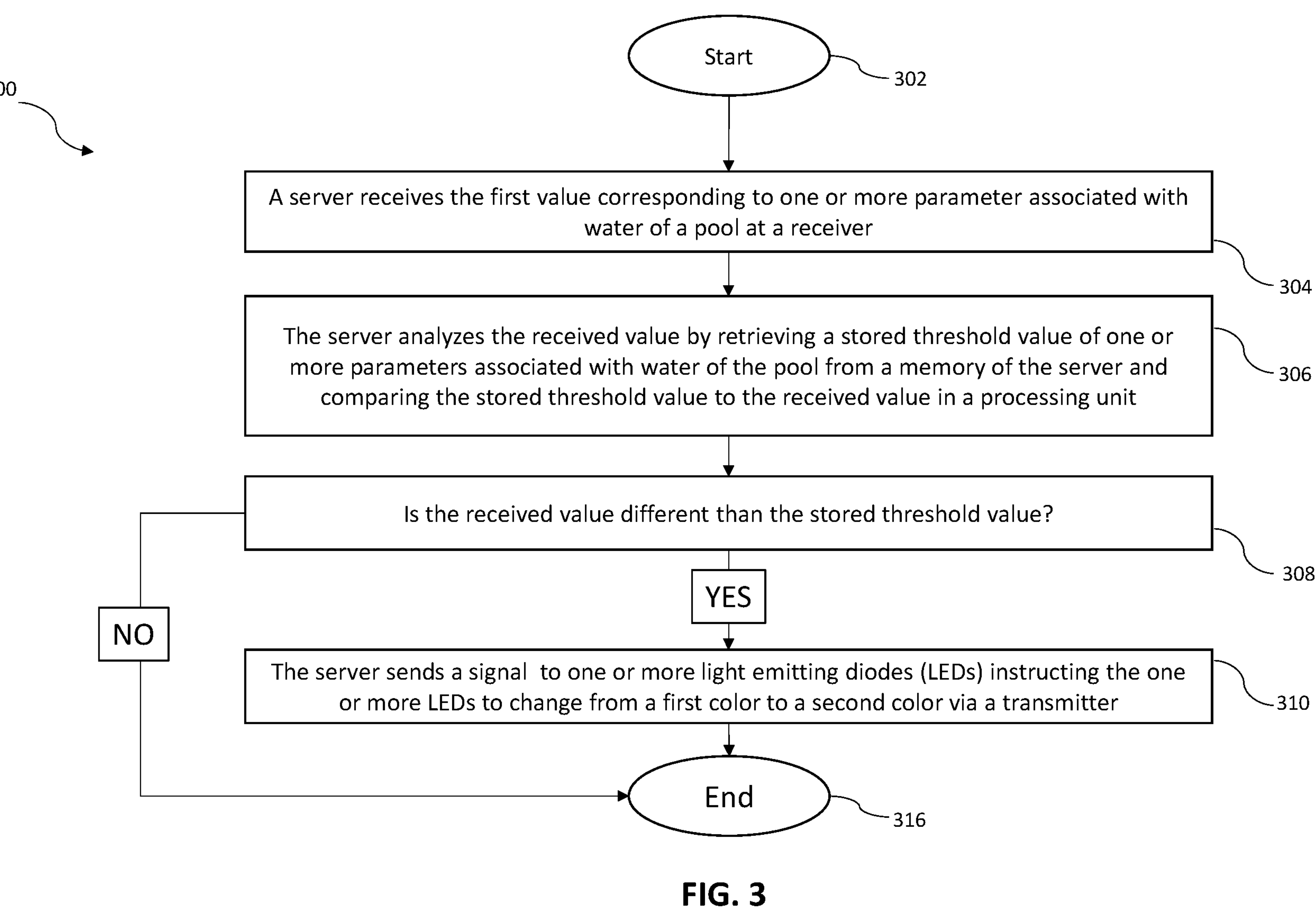
FIG. 3 schematically illustrates a method for automatically changing a color of one or more pool lights according to an embodiment.

FIG. 3 illustrates a flow diagram of a method 300 for automatically changing a color of pool lights to notify a user that there is an anomaly associated with one or more water quality parameters.

The method 300 starts at step 302. At step 304, a server, such as the server 140 of FIGS. 1 and 2, may receive a value corresponding to one or more water quality parameters. The one or more water quality parameters may be measured by one or more sensors, such as the plurality of sensors 120 of FIG. 1. The sensor(s) may transmit the received values to the server as discussed above in reference to FIGS. 1 and 2.

The sensor(s) may be configured to periodically measure one or more water quality parameters and transmit the information to the server. For example, the sensor(s) may be configured to measure one or more water quality parameters over a pre-defined time period (e.g., continuously, substantially continuously, every 15 minutes, 30 minutes, 60 minutes, once a day, etc.).

Additionally, or alternatively, the sensor(s) may detect and transmit one or more measured water quality values to the server on demand when the server receives a request from a user via a user device, such as described in FIGS. 1 and 2. For example, a user may request a retrieval of a current or recent temperature value of the pool water. On receiving the request, the server may transmit a command to the sensor(s) to measure and/or provide a recent value corresponding to the one or more parameters requested. For example, the sensor(s) may measure a temperature value of 40° F. which may be the current temperature of the water in the pool. The sensor may then transmit the temperature information back to the server.

At step 306, the server may analyze the values corresponding to the one or more water quality parameters to determine if an anomaly is present. To determine if an anomaly is present, a processing unit of the server may compare a recent value measured by the sensor(s) to a stored value or range retrieved from a memory of the server. The processing unit may be the processing unit 200*b* of FIG. 2, and the memory may be the memory 200*d* of FIG. 2. In particular, the processing unit may compare the measured temperature of 40° Fahrenheit from step 304 to a stored value or range from the memory. Here, the stored value may be a pre-programmed setpoint such as 70° F. Thus, at Step 308, the controller of the processing unit may determine there is an anomaly in the temperature because the value measured at Step 304 (i.e., 40° F.) does not match the stored value (i.e., 70° F.).

If an anomaly is detected, then at step 310, the server may transmit a signal to one or more lights to change from the first state to a second state based on the anomaly. The one or more lights may be the plurality of lights 130 of FIG. 1.

By changing a color of a light(s), a visual notification of the anomaly (i.e., automatically changing color of a pool light(s)) is provided to the user. The visual notification may reduce or eliminate the need for the user to manually identify a change or anomaly in one or more water quality parameters. This may be convenient for the user because the user may be able to quickly identify if one or more water quality parameters are out of sync. Moreover, the user may be timely informed regarding the change in one or more water quality parameters so that the user may take appropriate and corrective action(s) to address the anomaly.

The visual notification may be provided in various forms. For example, the pool light may flash or be turned off and on in a pattern or sequence, or the light may be provided as a solid color, or the light may be provided as a first color and change to a second color after a pre-determined time (e.g., if corrective action is not taken). The one or more pool lights may utilize each of these operations collectively, or may light up individually.

Once the user is visually notified by the changing the color of the light(s), the user may opt or select a "Dismiss/Reject" option in an application of a user device to turn-off the color emitted by the light(s). The user device may be the user device 150 of FIG. 1. After selecting the "Dismiss/Reject" option in the application, the user device may communicate with the server and in turn, the server may communicate with the light(s) to return to the first state such as off (i.e., no color) or to a standard color such as white light.

In another non-limiting example, in addition to changing the light(s) from a first state to a second state, the server may be configured to transmit a signal to one or more pool devices to automatically adjust their operation in response to the anomaly. For example, the server may transmit instructions to a heating/cooling system (e.g., pool heater) of the pool to increase the temperature of the water until the water has reached the stored temperature value of 70° F.

Still referring to FIG. 3, in an alternative example, at step 308, the server may determine that an anomaly does not exist. For example, at step 304 the received value may be 70° F. (i.e., equivalent to the stored value). Thus, no command is sent to the light(s) to change color and/or no command is sent to the pool equipment system. Therefore, the method ends at 312. In some instances, a command may be sent to the light(s) to change color when the when the measured value is equal to the stored value or within the stored range.

Referring to FIGS. 1-3, the present disclosure encompasses various ways or means to change the color of one or more pool lights. In some embodiments, the color of the lights may be controlled by a series of power-cycling commands. Herein, a power-cycling command means a rapid series of OFF/ON/OFF/ON power-cycles of a known number to which the light responds. For example, if a system rapidly cycles the electrical power to the color changing lights in a series of six power-cycles, the light may respond by entering a 'California Sunset' color. If the system rapidly cycles the electrical power to the color changing lights in a series of ten power-cycles, the light(s) may respond by entering a 'Red' color. It is be understood that this power-cycling command scheme is just one way of changing the color of the light(s). However, it is to be further understood for a person skilled in the art that other ways or means of changing the color of the light(s) can also be employed.

In some embodiments, the first state of the light(s) is not a color and instead, the light(s) are initially turned-off and then eventually, turned-on in the "second state" to emit a color to visually notify the user. However, the first state may be a first color and the second state may be a second color. Further, the present disclosure is not to be limited to only a light color change from a first color to a second color. The light(s) may change to any number of various colors. (i.e., the pool light could display a first color to indicate parameter one, and a second color to indicate a second, different parameter two, and a third color to indicate parameter three, and so on).

In some embodiments, a color can be set or customized for each anomaly/parameter using a user device, such as the user device 150. For example, the user device can set a "Red" color of the light(s) for providing visual notification when a value corresponding to the temperature parameter exceeds, equals, or falls below a pre-defined threshold value or range. Similarly, the user device can set a "Blue" color of the light(s) for providing visual notification when a value corresponding to the chlorine level parameter exceeds, equals, or falls below a pre-defined threshold value or range. Likewise, the user device 50 can set "Yellow" color of the light(s) for providing visual notification when a value corresponding to the salt level parameter exceeds, equals, or falls below a pre-defined threshold value or range. In the same manner, different colors can be set by the user device to visual notify the user for different parameters.

The present disclosure further encompasses the user device setting a priority for each parameter associated with the pool water. For example, a user may set one water quality parameters as a primary water quality parameter when two water quality parameters conflict and/or two anomalies occurs at the same time. For example, if the temperature of the pool water exceeds the predefined temperature threshold and the chlorine level of the pool water also exceeds the predefined chlorine threshold at the same time, then in such a situation, only a single color may be blinked or emitted by the one or more light(s) based on the prioritization of the parameters.

If the user has given a first priority to the temperature parameter and has allocated a second priority to the chlorine level parameter, then the color corresponding to the temperature parameter will first be emitted by the light(s) followed by a different color corresponding to the chlorine level parameter. In one specific example, if the temperature is too low and the filter pressure is too high at the same time, then both of these anomalies are reflected through the color of the light, by displaying a first color for the low temperature and then displaying a second color for the high filter pressure. In a further example, one color may be displayed by a first light, and a second color may be displayed by a second light.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A method for illuminating a first pool light of a pool, comprising:

entering a first target value for a first water quality parameter and a second target value for a second water quality parameter into a user interface;

measuring the first water quality parameter using one or more sensors in communication with pool water to generate a first measured value;

transmitting the first measured value corresponding to the first water quality parameter associated with water of the pool;

analyzing the first measured value via a controller to determine a correlation between the first measured value and the first target value associated with the first water quality parameter;

assigning a first priority to the first water quality parameter and a second priority to the second water quality parameter; and transmitting a signal to the first pool light to change from a first state to a second state based on the first priority.

2. The method of claim 1, wherein the first water quality parameter is selected from a group consisting of a temperature value, a chlorine level, a filter pressure value, a skimmer basket blockage alert, a salt level value, a pH value, an oxidation-reduction potential (ORP) value, a hardness value, an alkalinity value, a cyanuric acid value, a free chlorine value, a chloramine value, a turbidity value, a bacteria/virus level, and combinations thereof.

3. The method of claim 1, further comprising:

measuring the second water quality parameter using the one or more sensors to determine a second measured value;

transmitting the second measured value corresponding to the second water quality parameter; and analyzing the second measured value via the controller to determine a correlation between the second measured value and the second target value associated with the second water quality parameter.

4. The method of claim 1, wherein the one or more sensors are programmed to continuously monitor the first water quality parameter over a first pre-defined period of time.

5. The method of claim 1, wherein the one or more sensors are programmed to monitor the first water quality parameter in response to a direct prompt from a user.

6. The method of claim 1, wherein the one or more sensors and the first pool light are installed in the pool.

7. The method of claim 1, wherein the first pool light is changed from the first state to the second state when the first measured value and the first target value associated with the first water quality parameter are equal with respect to each other.

8. The method of claim 1, wherein the first pool light is changed from the first state to the second state when the first measured value and the first target value associated with the first water quality parameter are different with respect to each other.

9. The method of claim 1, wherein the first target value associated with the first water quality parameter is provided in the form of a range of values.

10. The method of claim 1, wherein a second pool light is provided and is designed to correlate to a second water quality parameter.

11. The method of claim 1, wherein the first pool light and second pool light are illuminated in different colors when the first pool light and second pool light are in the second state.

12. The method of claim 1, wherein the second state of the first pool light is flashing, blinking, or providing another non-continuous illumination pattern.

13. The method of claim 1, wherein the second state of the first pool light is the light illuminated in a color other than white.

14. The method of claim 1, wherein a second signal is sent to the first pool light to transition the first pool light from the second state back to the first state.

15. A swimming pool notification system, comprising:

a first sensor designed to measure a first water quality parameter of water and a second sensor designed to measure a second water quality parameter of water associated with the swimming pool;

a first pool light disposed within the swimming pool; and a controller in communication with the first pool light, the first sensor, and the second sensor, the controller:

entering a first target value for the first water quality parameter and a second target value for the second water quality parameter into a user interface;

receiving a first measured value corresponding to the first water quality parameter associated with water of the pool;

analyzing the first measured value to determine a correlation between the first measured value and the first target value associated with the first water quality parameter;

assigning a first priority to the first water quality parameter; and transmitting a signal to the first pool light to change from a first state to a second state based on the first priority.

16. The swimming pool notification system of claim 15, wherein the first sensor measures at least one temperature value, a chlorine level, a filter pressure value, a skimmer basket blockage alert, a salt level value, a pH value, an oxidation-reduction potential (ORP) value, a hardness value, an alkalinity value, a cyanuric acid value, a free chlorine value, a chloramine value, a turbidity value, a bacteria/virus level, or combinations thereof.

17. The swimming pool notification system of claim 15, wherein the first sensor is disposed within the pool.

18. The swimming pool notification system of claim 15, wherein the first sensor is disposed in plumbing or a pool pad external to the pool.

19. The swimming pool notification system of claim 15, wherein a second signal is transmitted to a user device to display the correlation between the first measured value and the first target value associated with the first water quality parameter.

20. The swimming pool notification system of claim 15, wherein the controller transmits a third signal to a pool component instructing the pool component to adjust a flow rate, chemical dosage rate, run rate, or other operational parameter.

* * * * *